(12) United States Patent
Iwasaki

(10) Patent No.: US 6,753,877 B2
(45) Date of Patent: Jun. 22, 2004

(54) HALFTONE DOT IMAGE DISPLAY UNIT, AND HALFTONE DOT IMAGE DISPLAY PROGRAM STORAGE MEDIUM

(75) Inventor: Taiji Iwasaki, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 285 days.

(21) Appl. No.: 10/107,476

(22) Filed: Mar. 28, 2002

(65) Prior Publication Data

US 2002/0140657 A1 Oct. 3, 2002

(30) Foreign Application Priority Data

Mar. 29, 2001 (JP) ........................................ 2001-095631

(51) Int. Cl.$^7$ ................................................ G09G 5/02
(52) U.S. Cl. ..................................... 345/589; 345/690
(58) Field of Search ................................ 345/690, 698, 345/589, 593, 594, 595, 596, 597, 598, 600, 601; 358/296, 534, 528, 537, 538

(56) References Cited

U.S. PATENT DOCUMENTS

| | | | | |
|---|---|---|---|---|
| 4,668,996 A | * | 5/1987 | Hatayama et al. | 358/3.23 |
| 4,893,180 A | * | 1/1990 | Shigaki et al. | 358/521 |
| 5,838,837 A | * | 11/1998 | Hirosawa et al. | 382/284 |
| 5,963,714 A | * | 10/1999 | Bhattacharjya et al. | 358/1.9 |
| 6,580,434 B1 | * | 6/2003 | Curtis | 345/596 |

* cited by examiner

Primary Examiner—Kent Chang
(74) Attorney, Agent, or Firm—Sughrue Mion, PLLC (57) ABSTRACT

In a halftone dot image display unit, a desired position on a multi-tone level image displayed on the display screen and a size of the peripheral area are designated, and the partial halftone dot image data representative of the partial halftone dot image is generated from the partial multi-tone level image data representative of the partial multi-tone level image within the peripheral area of the designated position. The partial halftone dot image represented by the partial halftone dot image data is displayed on the display screen.

7 Claims, 9 Drawing Sheets

| | | |
|---|---|---|
| 81 — RESOLUTION | 304 dpi | |
| 82 — POINTER INDICATION POSITION | (176,173) pixel | |
| 83 — PIXEL VALUE | 106 | |
| 84 — DOT% | 41% | |
| 85 — PIXEL VALUE AFTER COLOR CONVERSION | 98 | |
| 86 — DOT% | 38% | |

Fig. 11

HALFTONE DOT IMAGE DISPLAY UNIT, AND HALFTONE DOT IMAGE DISPLAY PROGRAM STORAGE MEDIUM

BACKGROUND OF THE INVENTION

1. Field of the Invention

The present invention relates to a halftone dot image display unit in which halftone dot image data is created from multi-tone level image data, so that a halftone dot image represented by the created halftone dot image data is displayed, and a halftone dot image display program storage medium storing a halftone dot image display program which causes a computer to operate as such a halftone dot image display unit.

2. Description of the Related Art

Hitherto, according to a printing machine and some printer, a halftone image is outputted on a printing sheet in accordance with halftone dot image data representative of a halftone dot image.

With respect to a creation of the halftone dot image data, for example, pixel values of pixels of multi-tone level image data consisting of an assembly of pixels each having a pixel value according to gradation, wherein a halftone dot pattern (a threshold matrix) consisting of an arrangement of thresholds is superposed on the multi-tone level image data, are compared with the thresholds of the threshold matrix, and the pixel values of the pixels of the multi-tone level image data are converted into binaries, so that the halftone dot image data representative of a dot pattern of the halftone dots is created.

For example, to perform an image printing using a printing machine, prior to performing the printing, an image display unit such as a CRT display unit is used to display a halftone dot image similar to a printed image to be obtained by printing of the printing machine, and ways of occurrence of Rosette pattern, moiré pattern and dot gain of halftone dots are investigated so that finish of the printed image to be obtained by printing of the printing machine is predicted.

However, according to the above-mentioned halftone dot image display unit in which halftone dot image data is created from multi-tone level image data, so that a halftone dot image represented by the created halftone dot image data is displayed on a display screen of the image display unit, it takes a lot of time, in proportion to a size of the multi-tone level image to be based, from the issue of an instruction that the multi-tone level image is converted into the halftone dot image and then displayed, to the display of the halftone dot image on the display screen of the image display unit. As a result, it takes a lot of time up to the confirmation of halftone dot geometry and the like of the halftone dot image, and thus working efficiency is poor.

SUMMARY OF THE INVENTION

In view of the foregoing, it is an object of the present invention to provide a halftone dot image display unit capable of displaying halftone dots in short time, and a halftone dot image display program storage medium storing a halftone dot image display program which causes a computer to operate as such a halftone dot image display unit.

To achieve the above-mentioned object, the present invention provides a halftone dot image display unit comprising:

a multi-tone level image display section for displaying a multi-tone level image represented by multi-tone level image data consisting of an assembly of pixels each having a pixel value according to a gradation;

a position designation section for designating a desired position on the multi-tone level image displayed by said multi-tone level image display section;

a data deriving section for deriving partial multi-tone level image data representative of the partial multi-tone level image within a peripheral area of the position designated by said position designation section, of the multi-tone level image, from the multi-tone level image data representative of the multi-tone level image displayed by said multi-tone level image display section;

a partial halftone dot image data generation section causing the partial multi-tone level image data derived by said data deriving section to be affected by a predetermined threshold matrix so as to generate partial halftone dot image data representative of the partial halftone dot image associated with the partial multi-tone level image; and a partial halftone dot image display section for displaying a partial halftone dot image represented by the partial halftone dot image data generated by said partial halftone dot image data generation section.

According to the halftone dot image display unit of the present invention, a desired position on a multi-tone level image displayed on the display screen and a size of the peripheral area are designated, the partial halftone dot image data representative of the partial halftone dot image is generated from the partial multi-tone level image data representative of the partial multi-tone level image within the peripheral area of the designated position, and the partial halftone dot image represented by the partial halftone dot image data is displayed on the display screen. Thus, as compared with one in which halftone dot image data representative of the whole halftone dot image is generated from the multi-tone level image data representative of the whole multi-tone level image, and the whole halftone dot image represented by the halftone dot image data is displayed on the display screen of the image display unit, it is possible to implement that the partial halftone dot image of the periphery of the portion of the interest is displayed in short time.

Further, according to the halftone dot image display unit of the present invention, as a higher speed of display of the halftone dot image is implemented, a movement of the position to be designated on the multi-tone level image makes it possible to promptly display the partial halftone dot image in response to the moving operation of the position.

In the halftone dot image display unit according to the present invention as mentioned above, it is preferable that the halftone dot image display unit further comprises an area size designation section for designating a size of a peripheral area of the position designated by said position designation section, on the multi-tone level image displayed by said multi-tone level image display section, in accordance with an operation, and said data deriving section derives the partial multi-tone level image data representative of the partial multi-tone level image within the peripheral area of the position designated by said area size designation section, from the multi-tone level image data representative of the multi-tone level image.

According to the halftone dot image display unit having such an area size designation section, for example, in the event that processing in a short time is desired, it is possible to optionally determine a size of the area.

In the halftone dot image display unit according to the present invention as mentioned above, it is preferable that said halftone dot image display unit further comprises:

a resolution designation section for designating a resolution of the partial halftone dot image displayed by said partial halftone dot image display section in accordance with an operation; and a resolution conversion section for applying a resolution conversion processing according to the resolution designated by said resolution designation section to the partial multi-tone level image data derived by said data deriving section, and said partial halftone dot image data generation section causes partial multi-tone level image data subjected to the resolution conversion processing by said resolution conversion section to be affected by a predetermined threshold matrix so as to generate partial halftone dot image data representative of the partial halftone dot image associated with the partial multi-tone level image represented by the partial multi-tone level image data.

According to the halftone dot image display unit having such resolution designation section and resolution conversion section as mentioned above, it is possible to optionally designate a desired resolution so as to display the partial halftone dot image according to the designated resolution.

Further, in the halftone dot image display unit of the present invention as mentioned above, it is preferable that said halftone dot image display unit further comprises:

a color conversion section for applying a color conversion processing to the partial multi-tone level image data derived by said data deriving section, and said partial halftone dot image data generation section causes partial multi-tone level image data subjected to both the color conversion processing by said color conversion section and the resolution conversion processing by said resolution conversion section to be affected by a predetermined threshold matrix so as to generate partial halftone dot image data representative of the partial halftone dot image associated with the partial multi-tone level image represented by the partial multi-tone level image data.

According to the halftone dot image display unit having such a color conversion section as mentioned above, it is possible to investigate details of halftone dots subjected to the color conversion processing.

Furthermore, in the halftone dot image display unit of the present invention as mentioned above, it is preferable that said halftone dot image display unit further comprises an information display section for displaying a pixel value of the position designated by said position designation section, of the multi-tone level image displayed by said multi-tone level image display section, and a dot % value of a position corresponding to a position on the multi-tone level image designated by said position designation section, of the partial halftone dot image represented by the partial halftone dot image data generated by said partial halftone dot image data generation section.

Still further, in the halftone dot image display unit of the present invention as mentioned above, it is preferable that said halftone dot image display unit further comprises:

a color conversion section for applying a color conversion processing to the partial multi-tone level image data derived by said data deriving section, and said information display section displays, in addition to said pixel value and said dot % value, a pixel value of a position corresponding to a position on the multi-tone level image designated by said position designation section, of the partial multi-tone level image represented by the partial multi-tone level image data subjected to the color conversion processing.

According to the halftone dot image display unit having such an information display section as mentioned above, the pixel value and the dot % value are displayed on the display screen of the halftone dot image display unit. Thus, it is possible to immediately confirm the numerical data of the halftone dot of interest.

To achieve the above-mentioned object, the present invention provides a halftone dot image display program storage medium storing a halftone dot image display program which causes a computer to operate as a halftone dot image display unit, said halftone dot image display unit comprising:

a multi-tone level image display section for displaying a multi-tone level image represented by multi-tone level image data consisting of an assembly of pixels each having a pixel value according to a gradation;

a position designation section for designating a desired position on the multi-tone level image displayed by said multi-tone level image display section;

a data deriving section for deriving partial multi-tone level image data representative of the partial multi-tone level image within a peripheral area of the position designated by said position designation section, of the multi-tone level image, from the multi-tone level image data representative of the multi-tone level image displayed by said multi-tone level image display section;

a partial halftone dot image data generation section causing the partial multi-tone level image data derived by said data deriving section to be affected by a predetermined threshold matrix so as to generate partial halftone dot image data representative of the partial halftone dot image associated with the partial multi-tone level image; and a partial halftone dot image display section for displaying a partial halftone dot image represented by the partial halftone dot image data generated by said partial halftone dot image data generation section.

In the halftone dot image display program storage medium according to the present invention as mentioned above, it is preferable that the halftone dot image display unit further comprises an area size designation section for designating a size of a peripheral area of the position designated by said position designation section, on the multi-tone level image displayed by said multi-tone level image display section, in accordance with an operation, and said data deriving section derives the partial multi-tone level image data representative of the partial multi-tone level image within the peripheral area of the position designated by said area size designation section, from the multi-tone level image data representative of the multi-tone level image.

In the halftone dot image display program storage medium according to the present invention as mentioned above, it is preferable that said halftone dot image display unit further comprises:

a resolution designation section for designating a resolution of the partial halftone dot image displayed by said partial halftone dot image display section in accordance with an operation; and a resolution conversion section for applying a resolution conversion processing according to the resolution designated by said resolution designation section to the partial multi-tone level image data derived by said data deriving section, and said partial halftone dot image data generation section causes partial multi-tone level image data subjected to the resolution conversion processing by said resolution conversion section to be affected by a predetermined threshold matrix so as to generate partial halftone dot image data representative of the partial halftone dot image associated with the partial multi-tone level image represented by the partial multi-tone level image data.

Further, in the halftone dot image display program storage medium of the present invention as mentioned above, it is preferable that said halftone dot image display unit further comprises:

a color conversion section for applying a color conversion processing to the partial multi-tone level image data derived by said data deriving section, and said partial halftone dot image data generation section causes partial multi-tone level image data subjected to both the color conversion processing by said color conversion section and the resolution conversion processing by said resolution conversion section to be affected by a predetermined threshold matrix so as to generate partial halftone dot image data representative of the partial halftone dot image associated with the partial multi-tone level image represented by the partial multi-tone level image data.

Furthermore, in the halftone dot image display program storage medium of the present invention as mentioned above, it is preferable that said halftone dot image display unit further comprises an information display section for displaying a pixel value of the position designated by said position designation section, of the multi-tone level image displayed by said multi-tone level image display section, and a dot % value of a position corresponding to a position on the multi-tone level image designated by said position designation section, of the partial halftone dot image represented by the partial halftone dot image data generated by said partial halftone dot image data generation section.

Still further, in the halftone dot image display program storage medium of the present invention as mentioned above, it is preferable that said halftone dot image display unit further comprises:

a color conversion section for applying a color conversion processing to the partial multi-tone level image data derived by said data deriving section, and said information display section displays, in addition to said pixel value and said dot % value, a pixel value of a position corresponding to a position on the multi-tone level image designated by said position designation section, of the partial multi-tone level image represented by the partial multi-tone level image data subjected to the color conversion processing.

DETAILED DESCRIPTION OF PREFERRED EMBODIMENTS

Embodiments of the present invention will be described with reference to the accompanying drawings.

Figure 1:
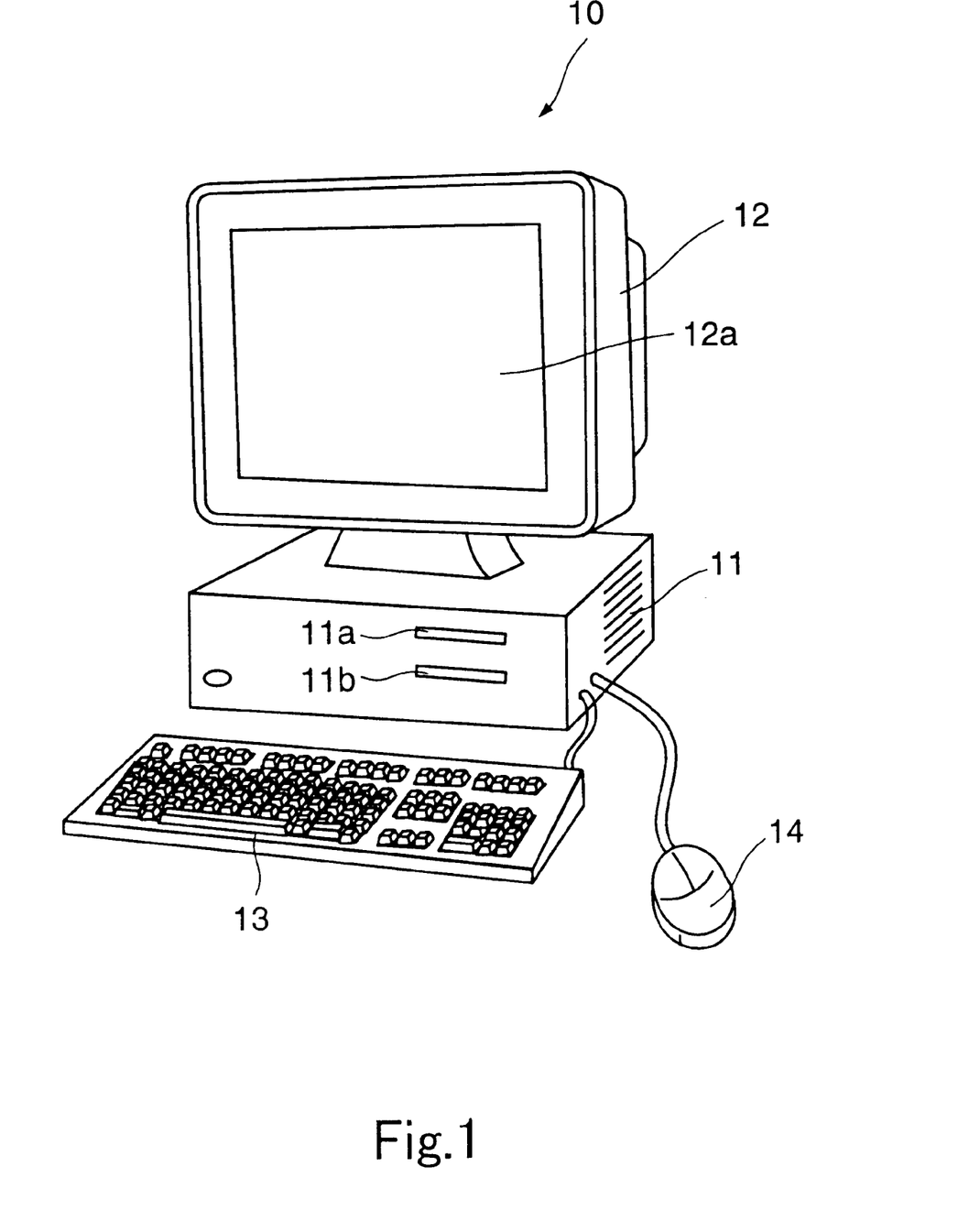
FIG. 1 is a perspective view of a personal computer to which an embodiment of the present invention is applied.
Figure 2:
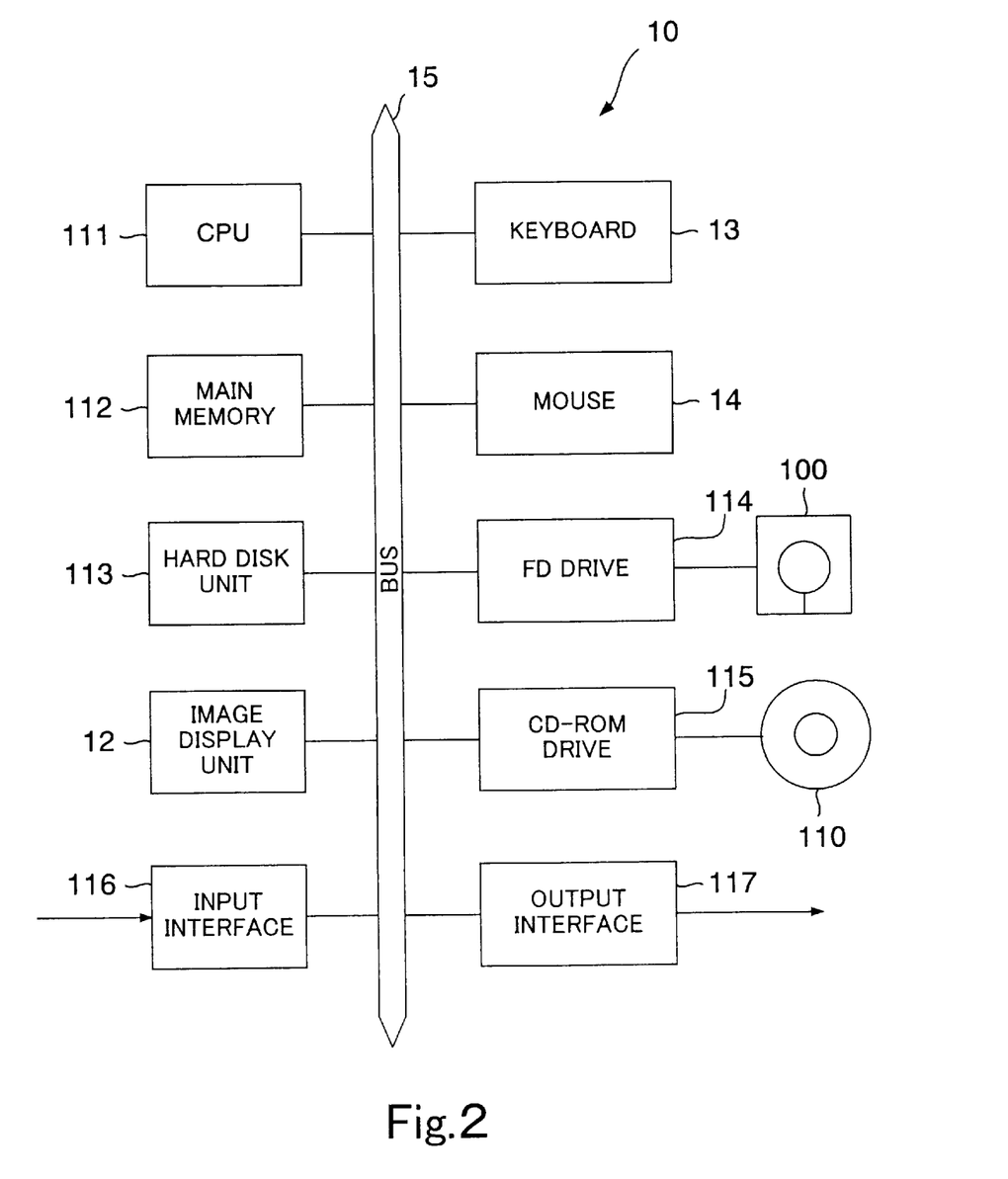
FIG. 2 is a hardware structural view of the personal computer.

FIG. 1 is a perspective view of a personal computer to which an embodiment of the present invention is applied. FIG. 2 is a hardware structural view of the personal computer.

As shown in FIG. 1, a personal computer 10 comprises, on an external appearance, a main frame unit 11, an image display unit 12 for displaying an image on a display screen 12a in accordance with an instruction from the main frame unit 11, a keyboard 13 for inputting various sorts of information to the main frame unit 11 in accordance with a key operation, and a mouse 14 for inputting an instruction according to, for example, an icon and the like, through designation of an optional position on the display screen 12a, the icon and the like being displayed on the position on the display screen 12a. The optional position on the display screen 12a to be designated by the mouse 14 is confirmed by a mouse pointer which freely moves on the display screen 12a in accordance with an operation of the mouse 14 and indicates the instruction position by the mouse 14 on the display screen 12a. The main frame unit 11 has a floppy disk (FD) mounting slot 11a for mounting a floppy disk (FD), and a CD-ROM mounting slot 11b for mounting a CD-ROM.

The main frame unit 11 comprises, as shown in FIG. 2, a CPU 111 for executing a various types of program, a main memory 112 in which a program stored in a hard disk unit 113 is read out and developed for execution by the CPU 111, the hard disk unit 113 for saving various types of programs and image data, an FD drive 114 for accessing a floppy disk 100 mounted thereon, a CD-ROM drive 115 for accessing a CD-ROM 110 mounted thereon, an I/O interface 116 connected to a color scanner and the like (not illustrated), to receive image data from the color scanner and the like, and an output interface 117 connected to a color printer and the like (not illustrated) to transmit the image data to the color printer. These various types of elements are connected via a bus 15 to the image display unit 12, the keyboard 13 and the mouse 14.

The CD-ROM 110 stores therein a halftone dot image display program for causing the personal computer 10 to operate as a halftone dot image display apparatus. The CD-ROM 110 is mounted on the CD-ROM drive 115 so that the halftone dot image display program, which is stored in the CD-ROM 110, is up-loaded on the personal computer 10 and is stored in the hard disk unit 113.

Figure 3:
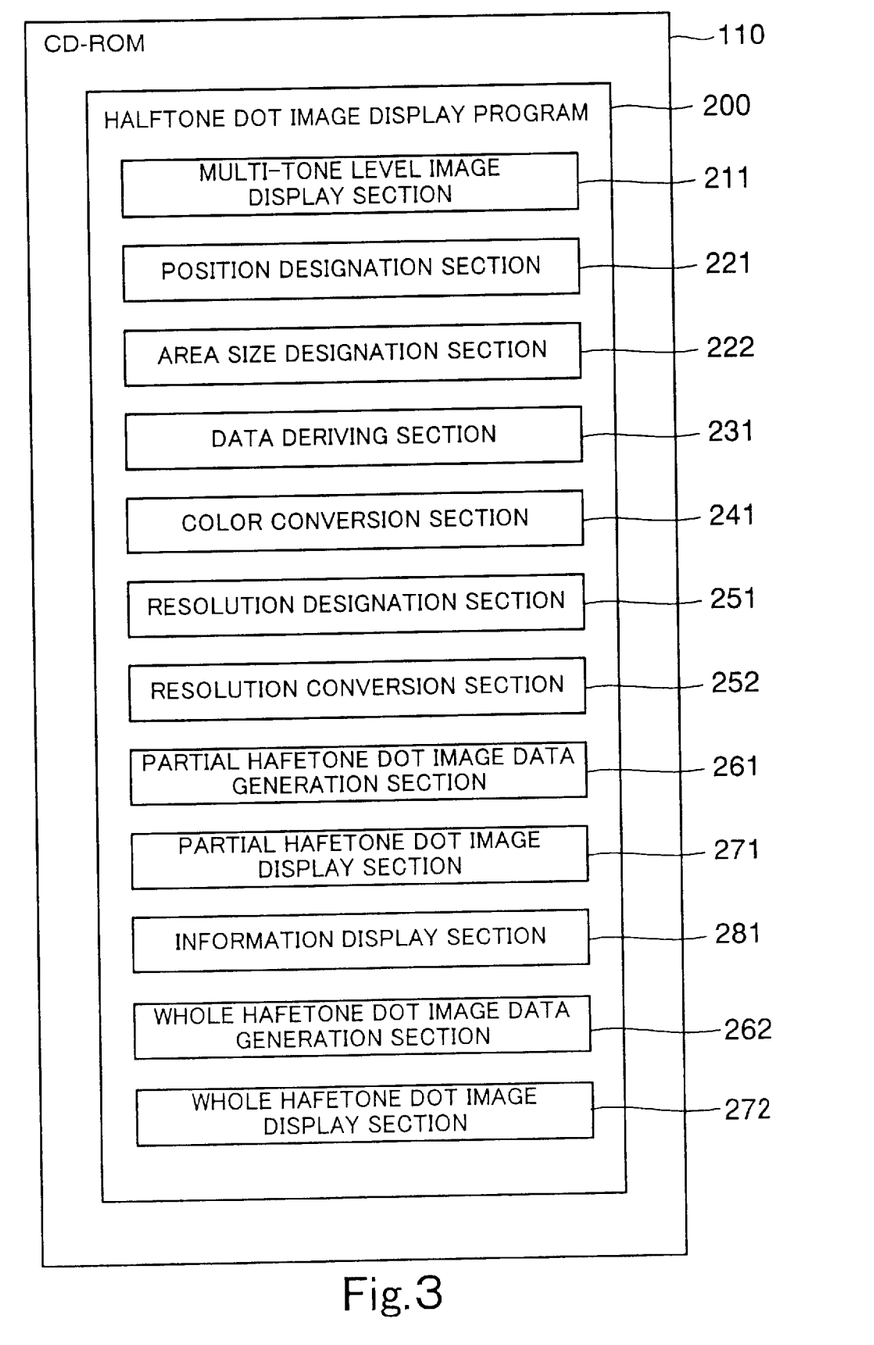
FIG. 3 is a view useful for understanding an embodiment of a halftone dot image display program of the present invention.

FIG. 3 is a view useful for understanding an embodiment of a halftone dot image display program of the present invention. The halftone dot image display program is stored in the CD-ROM 110 shown in FIG. 2.

A halftone dot image display program 200 comprises a multi-tone level image display section 211, a position designation section 221, an area size designation section 222, a data deriving section 231, a color conversion section 241, a resolution designation section 251, a resolution conversion section 252, a partial halftone dot image data generation section 261, a partial halftone dot image data display section 271, an information display section 281, a whole halftone dot image data generation section 262, and a whole halftone dot image data display section 272. Contents of the respective sections of the halftone dot image display program 200 will be described later.

Figure 4:
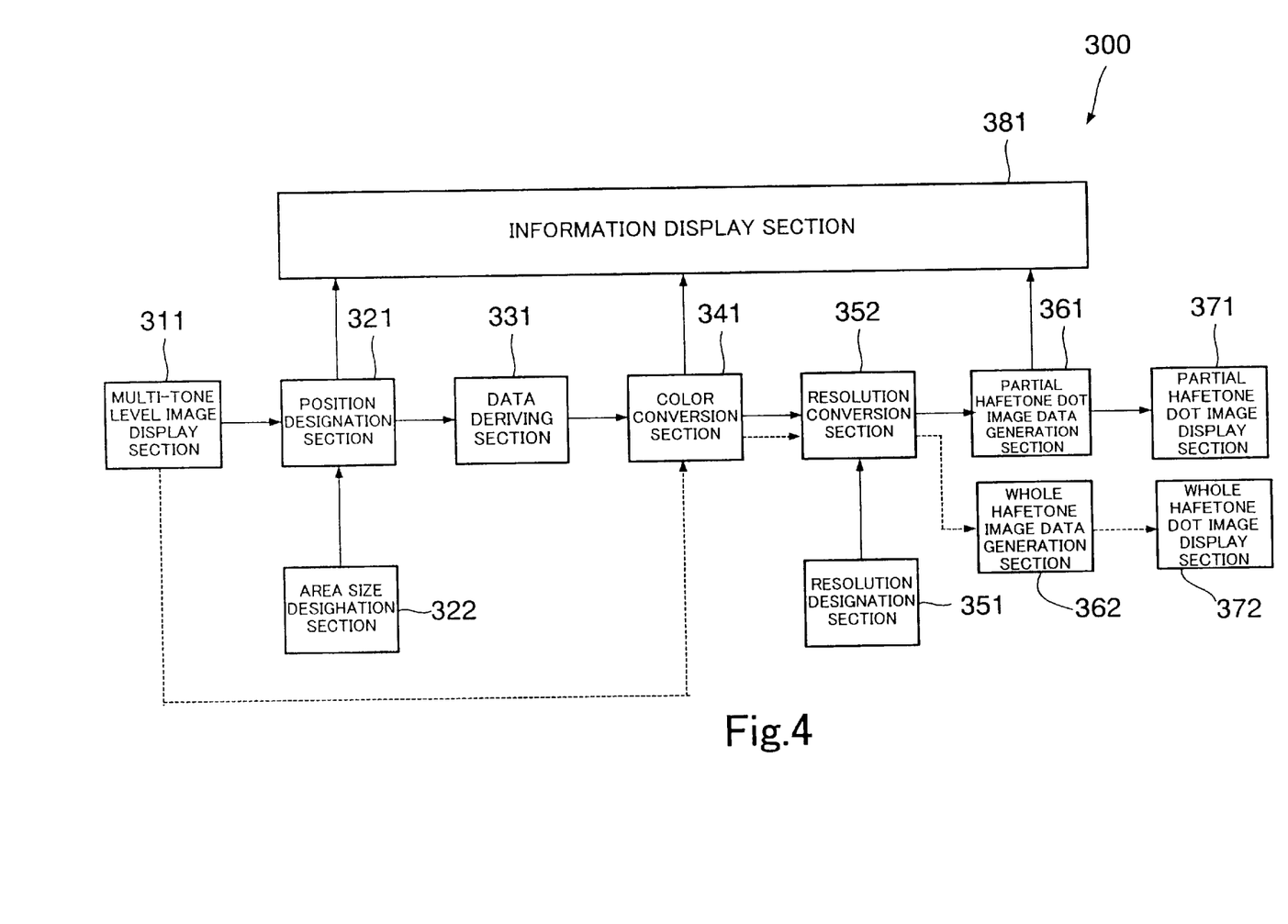
FIG. 4 is a functional block diagram of an embodiment of a halftone dot image display unit of the present invention.

FIG. 4 is a functional block diagram of an embodiment of a halftone dot image display unit of the present invention.

A halftone dot image display unit 300 shown in FIG. 4 is implemented when the halftone dot image display program 200 shown in FIG. 3 is loaded on the personal computer 10 shown in FIG. 1 and FIG. 2, and is executed in the personal computer 10.

A halftone dot image display unit 300 comprises a multi-tone level image display section 311, a position designation section 321, an area size designation section 322, a data deriving section 331, a color conversion section 341, a resolution designation section 351, a resolution conversion section 352, a partial halftone dot image data generation section 361, a partial halftone dot image data display section 371, an information display section 381, a whole halftone dot image data generation section 362, and a whole halftone dot image data display section 372. The multi-tone level image display section 311, the position designation section 321, the area size designation section 322, the data deriving section 331, the color conversion section 341, the resolution designation section 351, the resolution conversion section 352, the partial halftone dot image data generation section 361, the partial halftone dot image data display section 371, the information display section 381, the whole halftone dot image data generation section 362, and the whole halftone dot image data display section 372 comprise a combination of the a multi-tone level image display section 211, the position designation section 221, the area size designation section 222, the data deriving section 231, the color conversion section 241, the resolution designation section 251, the resolution conversion section 252, the partial halftone dot image data generation section 261, the partial halftone dot image data display section 271, the information display section 281, the whole halftone dot image data generation section 262, and the whole halftone dot image data display section 272, as software parts shown in FIG. 3, and a hardware of the personal computer 10 and an operation system (OS), which are necessary for implementing the respective functions of the software parts, respectively.

Hereinafter, there will be described functions of the present embodiment.

The multi-tone level image display section 311 corresponds, on a hardware basis, to a combination of the display screen 12*a* of the image display unit 12 of the personal computer 10 shown in FIG. 1 and the CPU 111 (cf. FIG. 2) in which the multi-tone level image display section 211 of the halftone dot image display program 200 shown in FIG. 3 is executed. The multi-tone level image display section 311 displays, on the display screen 12*a* of the image display unit 12 of the personal computer 10 shown in FIG. 1, multi-tone image data represented by multi-tone level image data consisting of an assembly of pixels each having the pixel value according to a gradation, for example, multi-tone level image data read through a color scanner (not illustrated) and the like, and multi-tone level image data created in the personal computer 10 shown in FIG. 1.

The position designation section 321 corresponds, on a hardware basis, to a combination of the keyboard 13, the mouse 14 of the personal computer 10 shown in FIG. 1 and the CPU 111 (cf. FIG. 2) in which the position designation section 221 of the halftone dot image display program 200 shown in FIG. 3 is executed. The position designation section 321 designates a desired position on a multi-tone level image on the display screen 12*a* of the image display unit 12 of the personal computer 10 shown in FIG. 1, which is displayed by the multi-tone level image display section 311, in accordance with an operation of the keyboard 13 or the mouse 14 of the personal computer 10 shown in FIG. 1 by an operator.

The area size designation section 322 corresponds, on a hardware basis, to a combination of the keyboard 13, the mouse 14 of the personal computer 10 shown in FIG. 1 and the CPU 111 (cf. FIG. 2) in which the area size designation section 222 of the halftone dot image display program 200 shown in FIG. 3 is executed. The area size designation section 322 designates a size of the peripheral area of a position, which is designated by the position designation section 321, in accordance with an operation of the keyboard 13 or the mouse 14 of the personal computer 10 shown in FIG. 1 by an operator.

The data deriving section 331 corresponds, on a hardware basis, to the CPU 111 (cf. FIG. 2) in which the data deriving section 231 of the halftone dot image display program 200 shown in FIG. 3 is executed. The data deriving section 331 derives the partial multi-tone level image data representative of the partial multi-tone level image within the peripheral area of the size designated by the area size designation section 322 from the multi-tone level image data representative of the multi-tone level image, which is displayed by the multi-tone level image display section 311.

The color conversion section 341 corresponds, on a hardware basis, to the CPU 111 (cf. FIG. 2) in which the color conversion section 241 of the halftone dot image display program 200 shown in FIG. 3 is executed. The color conversion section 341 applies a color conversion processing to the partial multi-tone level image data derived by the data deriving section 331.

The resolution designation section 351 corresponds, on a hardware basis, to a combination of the keyboard 13, the mouse 14 of the personal computer 10 shown in FIG. 1 and the CPU 111 (cf. FIG. 2) in which the resolution designation section 251 of the halftone dot image display program 200 shown in FIG. 3 is executed. The resolution designation section 351 designates a resolution of the partial halftone dot image to be displayed on the partial halftone dot image display section 371 (which will be described later), in accordance with an operation of the keyboard 13 or the mouse 14 of the personal computer 10 shown in FIG. 1 by an operator.

The resolution conversion section 352 corresponds, on a hardware basis, to the CPU 111 (cf. FIG. 2) in which the resolution conversion section 252 of the halftone dot image display program 200 shown in FIG. 3 is executed. The resolution conversion section 352 applies a resolution conversion processing according to the resolution designated by the resolution designation section 351 to the partial multi-tone level image data which is subjected to the color conversion processing by the color conversion section 341.

The partial halftone dot image data generation section 361 corresponds, on a hardware basis, to the CPU 111 (cf. FIG. 2) in which the partial halftone dot image data generation section 261 of the halftone dot image display program 200 shown in FIG. 3 is executed. The partial halftone dot image data generation section 361 causes the partial multi-tone level image data, which is subjected to both the color conversion processing by the color conversion section 341 and the resolution conversion processing by the resolution conversion section 352, to be affected by a predetermined threshold matrix so as to generate partial halftone dot image data representative of the partial halftone dot image associated with the partial multi-tone level image represented by the partial multi-tone level image data.

The partial halftone dot image data display section 371 corresponds, on a hardware basis, to a combination of the display screen 12a of the image display unit 12 of the personal computer 10 shown in FIG. 1 and the CPU 111 (cf. FIG. 2) in which the partial halftone dot image data display section 271 of the halftone dot image display program 200 shown in FIG. 3 is executed. The partial halftone dot image data display section 371 displays, on the display screen 12a of the image display unit 12 of the personal computer 10 shown in FIG. 1, partial halftone dot image represented by the partial halftone dot image data created by the partial halftone dot image data generation section 361.

The information display section 381 corresponds, on a hardware basis, to a combination of the display screen 12a of the image display unit 12 of the personal computer 10 shown in FIG. 1 and the CPU 111 (cf. FIG. 2) in which the information display section 281 of the halftone dot image display program 200 shown in FIG. 3 is executed. The information display section 381 displays, on the display screen 12a of the image display unit 12 of the personal computer 10 shown in FIG. 1, pixel values of a position designated by the position designation section 321, a dot % value of a position corresponding to the position designated by the position designation section 321, of the partial halftone dot image represented by the partial halftone dot image data created by the partial halftone dot image data generation section 361, and a pixel value of a position corresponding to the position designated by the position designation section 321, of the partial halftone dot image represented by the partial halftone dot image data subjected to the color conversion processing by the color conversion section 341.

The whole halftone dot image data generation section 362 corresponds, on a hardware basis, to the CPU 111 (cf. FIG. 2) in which the whole halftone dot image data generation section 262 of the halftone dot image display program 200 shown in FIG. 3 is executed. The whole halftone dot image data generation section 362 causes the multi-tone level image data representative of the multi-tone level image displayed by the multi-tone level image display section 311, which is subjected to both the color conversion processing by the color conversion section 341 and the resolution conversion processing by the resolution conversion section 352, to be affected by a predetermined threshold matrix so as to generate whole halftone dot image data representative of the whole halftone dot image associated with the multi-tone level image represented by the multi-tone level image data.

The whole halftone dot image data display section 372 corresponds, on a hardware basis, to a combination of the display screen 12a of the image display unit 12 of the personal computer 10 shown in FIG. 1 and the CPU 111 (cf. FIG. 2) in which the whole halftone dot image data display section 272 of the halftone dot image display program 200 shown in FIG. 3 is executed. The whole halftone dot image data display section 372 displays, on the display screen 12a of the image display unit 12 of the personal computer 10 shown in FIG. 1, whole halftone dot image represented by the whole halftone dot image data created by the whole halftone dot image data generation section 362.

Figure 5:
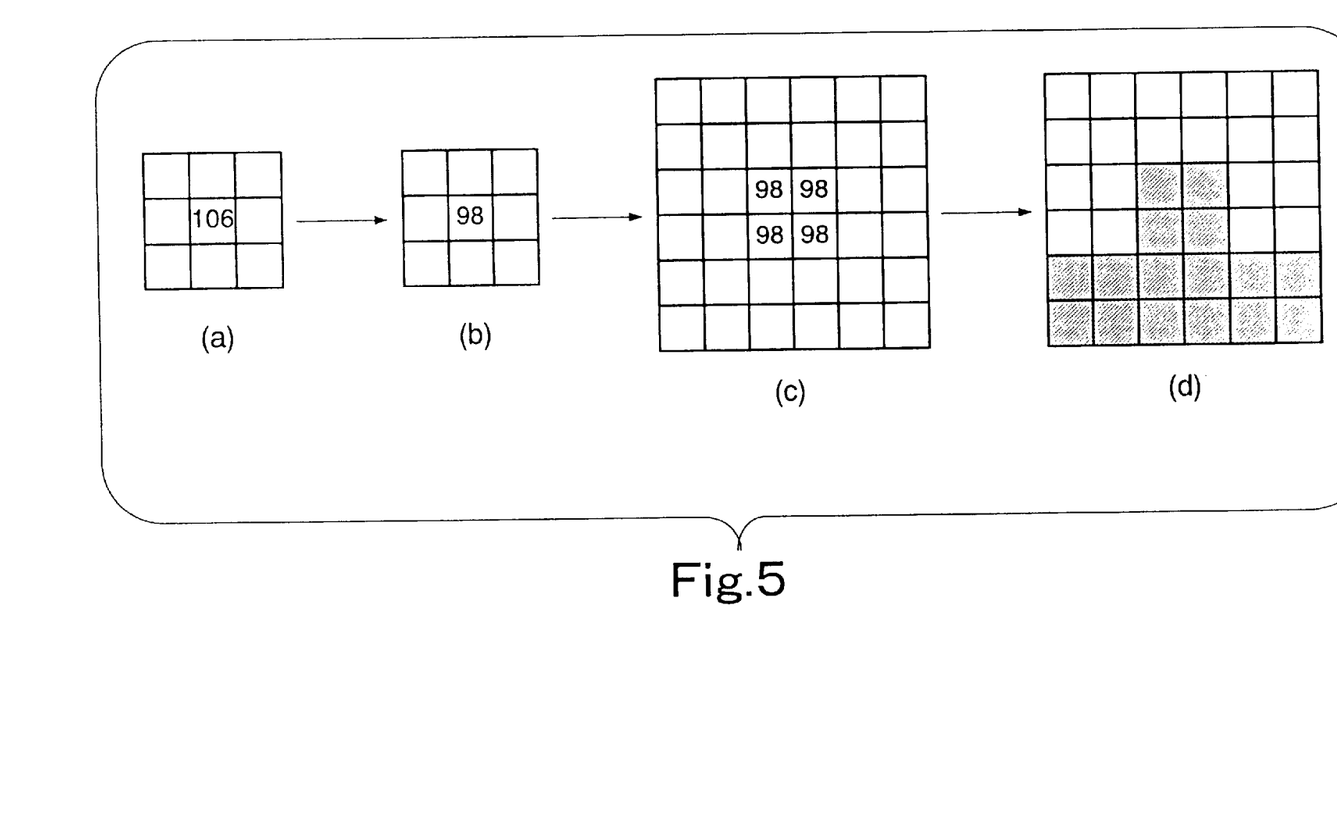
FIG. 5 is a typical illustration useful for understanding a process that both color conversion processing and resolution conversion processing are applied to partial multi-tone level image data, and partial halftone dot image data is generated in accordance with the partial multi-tone level image data after the processing.

FIG. 5 is a typical illustration useful for understanding a process that both color conversion processing and resolution conversion processing are applied to partial multi-tone level image data, and partial halftone dot image data is generated in accordance with the partial multi-tone level image data after the processing.

According to an example shown in a part (a) of FIG. 5, the partial multi-tone level image data representative of the partial multi-tone level image within the peripheral area of the size "3 pixels×3 pixels" designated by the area size designation section 322 (cf. FIG. 4), of the pixel of the pixel value "106" of the position designated by the position designation section 321 (cf. FIG. 4) is derived by the data deriving section 331 (cf. FIG. 4) from the multi-tone level image data representative of the multi-tone level image displayed by the multi-tone level image display section 311 (cf. FIG. 4). Here, only the pixel value "106" of the position designated by the position designation section 321 is shown, omitting the pixel values of the respective pixels.

A part (b) of FIG. 5 shows a result of conversions in which a color conversion processing by the color conversion section 341 (cf. FIG. 4) is applied to the partial multi-tone level image data shown in the part (a) of FIG. 5, so that pixel values of the associated pixels are converted. Here, on behalf of the pixel values of the pixels, there is shown only a matter that the pixel value "106" of the position designated by the position designation section 321 (cf. FIG. 4) is converted into "98".

A part (c) of FIG. 5 shows a result of processing in which a resolution conversion processing by the resolution conversion section 352 is applied to the partial multi-tone level image data after the color conversion processing by the color conversion section 341 (cf. FIG. 4), shown in the part (a) of FIG. 5, in accordance with resolution "twice resolution" designated by the resolution designation section 351 (cf. FIG. 4). Here, on behalf of the pixel values of the pixels, there is shown a matter that "1" pixels each having the pixel value "98" of the position corresponding to the position designated by the position designation section 321 (cf. FIG. 4) are converted into "2 pixels×2 pixels" through the resolution conversion with "twice resolution". Since the "twice resolution" is designated, as the whole of the partial multi-tone level image, the areas of "3 pixels×3 pixels" are converted into the areas of "6 pixels×6 pixels" in resolution.

A part (d) of FIG. 5 shows a partial halftone dot image represented by a partial halftone dot image data generated by causing the partial multi-tone level image data, which is subjected to both the color conversion processing by the color conversion section 341 (cf. FIG. 4) and the resolution conversion processing by the resolution conversion section 352 (cf. FIG. 4), to be affected by a predetermined threshold matrix, shown in the part (a) of FIG. 5. Here, hatched is the areas corresponding to the halftone dots of the partial halftone dot image, which are displayed on the display screen 12a of the image display unit 12 of the personal computer 10 shown in FIG. 1, by the partial halftone dot image data display section 371 (cf. FIG. 4).

Figure 6:
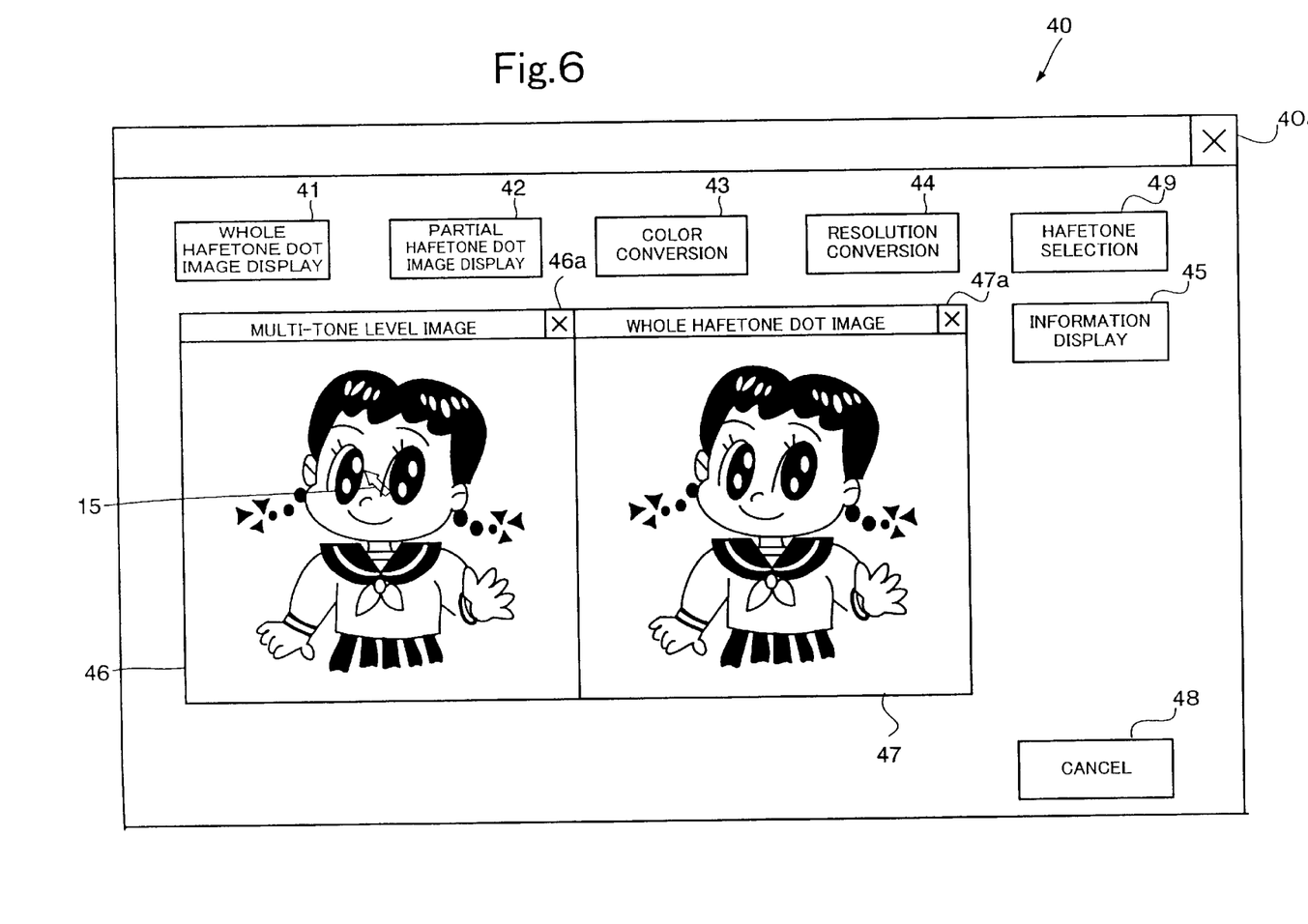
FIG. 6 is a view showing a main display screen of the halftone dot image display.

FIG. 6 is a view showing a main display screen of the halftone dot image display.

When a predetermined operation is performed by an operator through the keyboard 13 or the mouse 14 of the personal computer 10 shown in FIG. 1, a main display screen 40 is displayed on the display screen 12a of the image display unit 12 of the personal computer 10. Further, displayed on the display screen 12a is a mouse pointer 14p indicating an indication position by the mouse 14, which is freely movable on the display screen 12a in accordance with an operation of the mouse 14.

At the lower left of the main display screen 40, the multi-tone level image display section 311 (cf. FIG. 4) displays a multi-tone level image 46 represented by multi-tone level image data consisting of an assembly of pixels each having the pixel value according to a gradation. At the upper right of the multi-tone level image 46, there is provided an "x" mark button 46a. When the mouse pointer 14p is placed at the position of the "x" mark button 46a through the mouse operation and then clicked, the multi-tone level image 46 is closed.

At the upper left of the main display screen 40, there is provided a whole halftone dot image display button 41. When the whole halftone dot image display button 41 is clicked, the whole halftone dot image data generation section 362 (cf. FIG. 4) generates the whole halftone dot image data from the multi-tone level image data representative of the multi-tone level image 46 in its entirety, and the whole halftone dot image data display section 372 (cf. FIG. 4) displays a whole halftone dot image 47 represented by the whole halftone dot image data on the right side of the multi-tone level image 46, while the multi-tone level image 46 is displayed at the lower left of the main display screen 40. At the upper right of the whole halftone dot image 47, there is provided an "x" mark button 47a. When the mouse pointer 14p is placed at the position of the "x" mark button 47a through the mouse operation and then clicked, the whole halftone dot image 47 is closed.

On the right of the whole halftone dot image display button 41, there is provided a partial halftone dot image display button 42. When the partial halftone dot image display button 42 is clicked, a partial halftone dot image display screen (cf. FIG. 8), which will be described later, is displayed in form of a window different from the main display screen 40, while the main display screen 40 is displayed. In a state that the partial halftone dot image display screen (cf. FIG. 8) is opened, when the mouse pointer 14p is moved, through the mouse operation, from the position of the partial halftone dot image display button 42 to an optional position on the multi-tone level image 46, the data deriving section 331 derives the partial multi-tone level image data representative of the partial multi-tone level image within the peripheral area of the position designated by the position designation section 321 (cf. FIG. 4), and the partial halftone dot image data generation section 361 (cf. FIG. 4) generates the partial halftone dot image data from the partial halftone dot image data. The partial halftone dot image data display section 371 (cf. FIG. 4) displays the partial halftone dot image represented by the partial halftone dot image data on the partial halftone dot image display screen (cf. FIG. 8). Further, when the position of the mouse pointer 14p is moved on the multi-tone level image 46, the partial halftone dot image associated with the peripheral area of the position to which the mouse pointer 14p is moved is immediately displayed on the partial halftone dot image display screen (cf. FIG. 8).

On the right of the partial halftone dot image display button 42, there is provided a color conversion button 43. When the color conversion button 43 is clicked, a color conversion set up screen (cf. FIG. 9), which will be described later, is displayed in form of a window different from the main display screen 40, while the main display screen 40 is displayed.

On the right of the color conversion button 43, there is provided a resolution conversion button 44. When the resolution conversion button 44 is clicked, a resolution conversion set up screen (cf. FIG. 10), which will be described later, is displayed in form of a window different from the main display screen 40, while the main display screen 40 is displayed.

On the right of the resolution conversion button 44, there is provided a halftone selection button 49. When the halftone selection button 49 is clicked, a halftone set up screen (cf. FIG. 7), which will be described later, is displayed in form of a window different from the main display screen 40, while the main display screen 40 is displayed.

Below the halftone selection button 49, there is provided an information display button 45. When the information display button 45 is clicked, an information display screen (cf. FIG. 11), which will be described later, is displayed in form of a window different from the main display screen 40, while the main display screen 40 is displayed.

At the lower right of the main display screen 40, there is provided a cancel button 48. When the cancel button 48 is clicked, the main display screen 40 is closed. At the upper right of the main display screen 40, there is provided an "x" mark button 40a having the same function as the cancel button 48. Also when the "x" mark button 40a is clicked, the main display screen 40 is closed.

Figure 7:
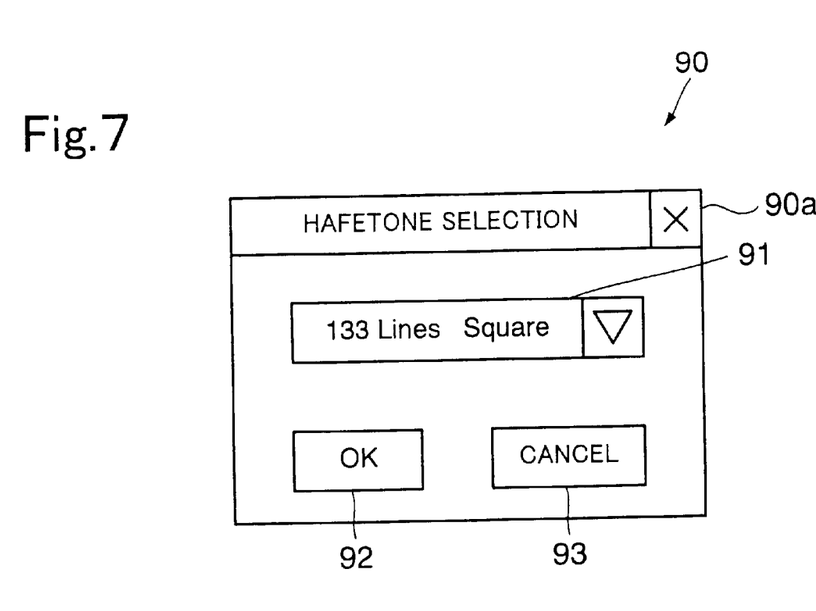
FIG. 7 is a view showing a halftone set up screen.

FIG. 7 is a view showing a halftone set up screen. A halftone set up screen 90 is displayed when the halftone selection button 49 is clicked.

The halftone set up screen 90 is provided with a list box 91 for selecting a halftone sort file stored in the hard disk unit 113 of the personal computer 10. When a "▽" mark on the right of the list box 91, a list of a halftone sort file (not illustrated) is displayed. On the list of the halftone sort file, there are displayed halftone sort files, for example, "133 lines Square", "133 lines Elliptical", "150 lines Square", "155 lines Elliptical". Where "xxx line" denotes the number of lines of halftone dots per inch. "Square" denotes that when the dot % is 50%, the geometry of the halftone dot is square and the halftone dot is in contact with the adjacent halftone dot. "Elliptical" denotes that when the dot % is 50%, the geometry of the halftone dot is elliptical and the halftone dot is in contact with the adjacent halftone dot.

When a desired file of the list of list of a halftone sort file is clicked, one file is selected so that the number of lines of halftone dots per inch and the geometry of the halftone dot are set up. According to the present embodiment, "133 lines Square" is selected.

At the lower left of the halftone set up screen 90, there is provided an OK button 92. The OK button 92 settles content selected by the list box 91. When the whole halftone dot image display button 41 (cf. FIG. 6) is clicked after the halftone sort file is selected and settled, whole halftone dot image data is created in accordance with the settled halftone sort file. Alternatively, when the partial halftone dot image display button 42 (cf. FIG. 6) is clicked after the halftone sort file is selected, partial halftone dot image data is created in accordance with the settled halftone sort file.

On the right of the OK button 92, there is provided a cancel button 93. The cancel button 93 is of annulling the set up altered after the halftone set up screen 90 is opened, and closing the halftone set up screen 90. At the upper right of the halftone set up screen 90, there is provided an "x" mark button 90a having the same function as the cancel button 93. Also when the "x" mark button 90a is clicked, it annuls the set up altered after the halftone set up screen 90 is opened, and closes the halftone set up screen 90.

Figure 8:
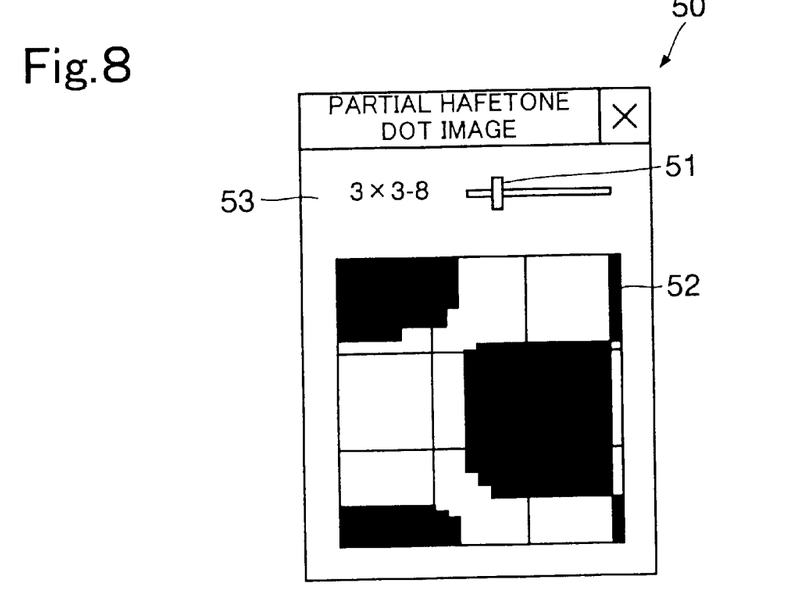
FIG. 8 is a view showing a partial halftone dot image display screen.

FIG. 8 is a view showing a partial halftone dot image display screen. A partial halftone dot image display screen 50 is displayed when the partial halftone dot image display button 42 is clicked.

At the upper right of the partial halftone dot image display screen 50, there is provided a slider 51 for designating a size of a peripheral area of a position designated through a mouse operation, of the mouse pointer 14p (cf. FIG. 6) on the multi-tone level image 46 shown in FIG. 6. When the slider 51 is dragged by the mouse 14 and moved in right and left, a size of an area is designated.

Below the slider 51, there is displayed a partial halftone dot image 52 within an area of the size designated by the slider 51 on the center of the mouse pointer 14p on the multi-tone level image 46 shown in FIG. 6.

On the left of the slider 51, there is provided a display column 53 in which there are displayed a size of an area designated by the slider 51 and a magnification of resolution of the partial halftone dot image 52 to the multi-tone level image 46, which will be described later. Here it is displayed in form of "size-magnification". Specifically, a size of an area of the periphery 3 pixels×3 pixels of the position of the mouse pointer 14p on the multi-tone level image 46 shown in FIG. 6 is displayed in form of "3×3". Since the partial halftone dot image 52 is displayed with resolution of eight times as degree as the multi-tone level image 46, the magnification is displayed "8".

At the upper right of the partial halftone dot image display screen 50, there is provided an "x" mark button 50a. When the "x" mark button 50a is clicked, the partial halftone dot image display screen 50 is closed.

Figure 9:
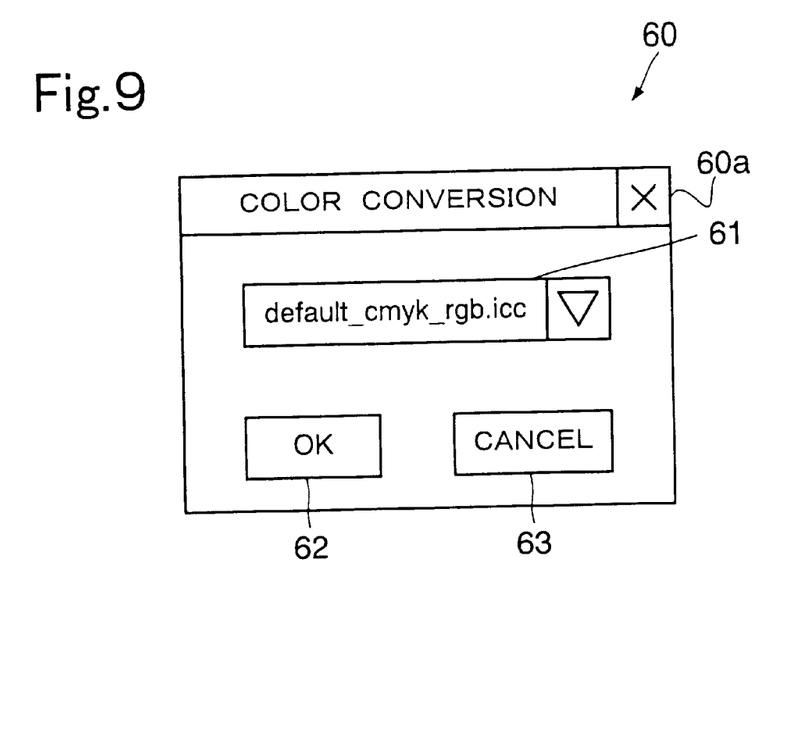
FIG. 9 is a view showing a color conversion set up screen.

FIG. 9 is a view showing a color conversion set up screen. A color conversion set up screen 60 is displayed when the color conversion button 43 is clicked.

The color conversion set up screen 60 is provided with a list box 61 for selecting a color conversion file stored in the hard disk unit 113 of the personal computer 10. When a "∇" mark on the right of the list box 61, a list of color conversion files (not illustrated) is displayed. When a desired one of the color conversion files of the list is clicked, the desired file is selected.

At the lower left of the color conversion set up screen 60, there is provided an OK button 62. The OK button 62 settles content selected by the list box 61, and executes the color conversion processing by the color conversion section 341 (cf. FIG. 4).

On the right of the OK button 62, there is provided a cancel button 63. The cancel button 63 is of annulling the set up altered after the color conversion set up screen 60 is opened, and closing the color conversion set up screen 60. At the upper right of the color conversion set up screen 60, there is provided an "x" mark button 60a having the same function as the cancel button 63. Also when the "x" mark button 60a is clicked, it annuls the set up altered after the color conversion set up screen 60 is opened, and closes the color conversion set up screen 60.

Figure 10:
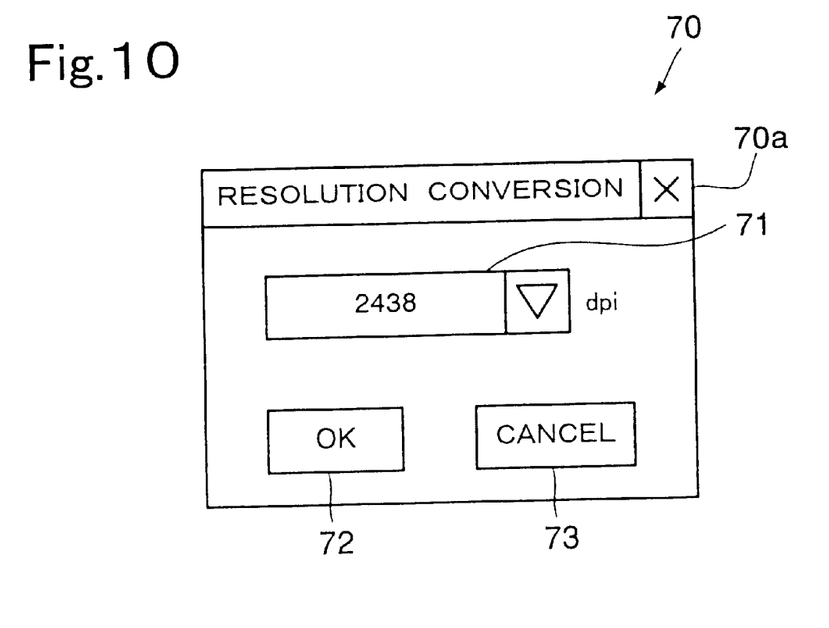
FIG. 10 is a view showing a resolution conversion set up screen.

FIG. 10 is a view showing a resolution conversion set up screen. A resolution conversion set up screen 70 is displayed when the resolution conversion button 44 is clicked.

The resolution conversion set up screen 70 is provided with a list box 71 for selecting a resolution of the partial halftone dot image 52. When a "∇" mark on the right of the list box 71, a list of resolutions (not illustrated) is displayed. When a desired one of the resolutions of the list is clicked, the desired resolution is selected.

At the lower left of the resolution conversion set up screen 70, there is provided an OK button 72. The OK button 72 settles content selected by the list box 71, and executes the resolution conversion processing by the resolution conversion section 351 (cf. FIG. 4).

On the right of the OK button 72, there is provided a cancel button 73. The cancel button 73 is of annulling the set up altered after the resolution conversion set up screen 70 is opened, and closing the resolution conversion set up screen 70. At the upper right of the resolution conversion set up screen 70, there is provided an "x" mark button 70a having the same function as the cancel button 73. Also when the "x" mark button 70a is clicked, it annuls the set up altered after the resolution conversion set up screen 70 is opened, and closes the resolution conversion set up screen 70.

Figure 11:
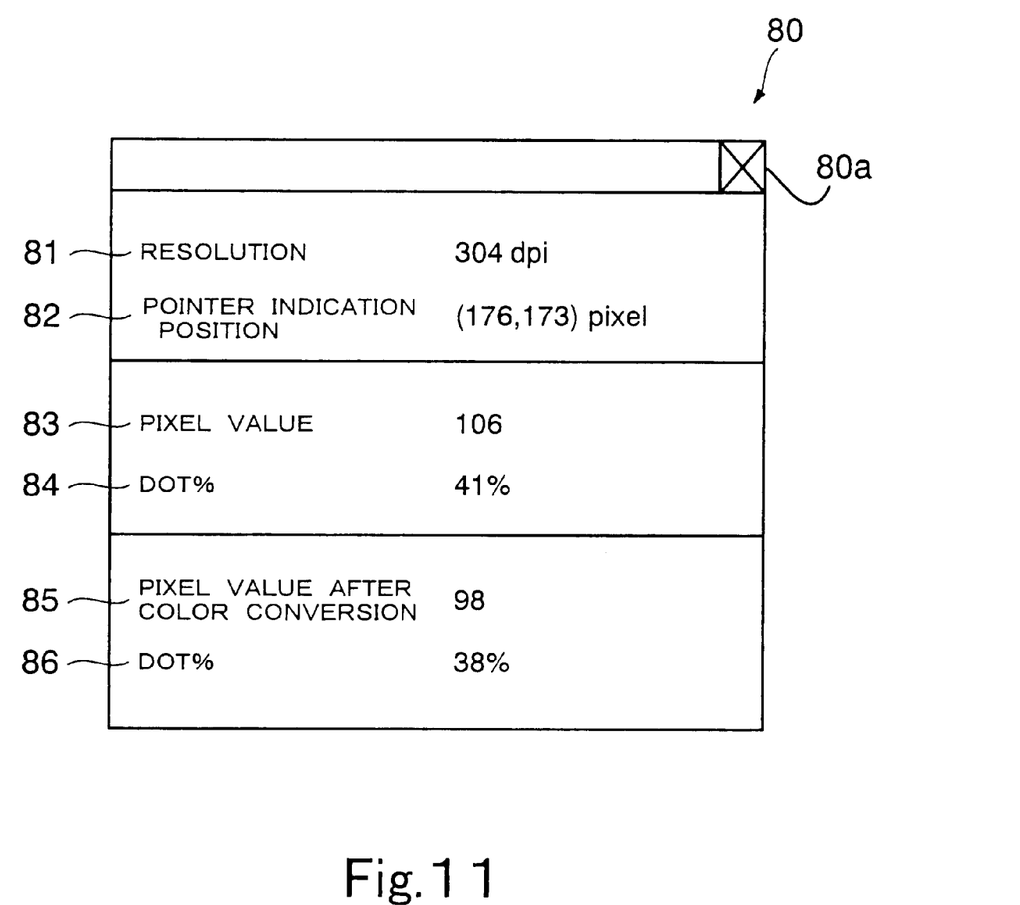
FIG. 11 is a view showing an information display screen.

FIG. 11 is a view showing an information display screen. An information display screen 80 is displayed when the information display button 45 shown in FIG. 6 is clicked.

On the information display screen 80, there are displayed by the information display section 381 (cf. FIG. 4) various sorts of information to execute the processing. Specifically, here, there are provided a display column 81 for a "resolution" of the multi-tone level image 46, a display column 82 for a "pointer indication position" on the multi-tone level image 46, a display column 83 for a "pixel value" of the pointer indication position, a display column 84 for a "dot %" of the partial halftone dot image 52, a display column 85 for a "pixel value after color conversion" of the pixel of the pointer indication position, and a display column 86 for a "dot %" of the partial halftone dot image 52 after the color conversion. Here, there are displayed "304 dpi" as the "resolution" of the display column 81, "(176, 173) pixel" as the "pointer indication position" of the display column 82, "106" as the "pixel value" of the display column 83, "41%" as the "dot %" of the display column 84, "98" as the "pixel value after color conversion" of the display column 85, and "38%" as the "dot %" of the display column 86.

At the upper right of the information display screen 80, there is provided an "x" mark button 80a. When the "x" mark button 80a is clicked, the information display screen 80 is closed.

As mentioned above, according to the a halftone dot image display unit in which a desired position on a multi-tone level image displayed on the display screen and a size of the peripheral area are designated, the partial halftone dot image data representative of the partial halftone dot image is generated from the partial multi-tone level image data representative of the partial multi-tone level image within the peripheral area of the designated position, and the partial halftone dot image represented by the partial halftone dot image data is displayed on the display screen, as compared with one in which halftone dot image data representative of the whole halftone dot image is generated from the multi-tone level image data representative of the whole multi-tone level image, and the whole halftone dot image represented by the halftone dot image data is displayed on the display screen of the image display unit, it is possible to implement that the partial halftone dot image of the periphery of the portion of the interest is displayed in short time. Further, it is possible to perform a color conversion processing and a resolution conversion processing as an occasion arises. Furthermore, a display of numerical data of the halftone of interest makes it possible to immediately confirm the data.

Incidentally, according to the present embodiment, the present invention is explained an example having a function that halftone dot image data representative of the whole halftone dot image is generated from the multi-tone level image data representative of the whole multi-tone level image, and the whole halftone dot image represented by the halftone dot image data is displayed on the display screen of the image display unit. However, this function is not always necessary for displaying halftone dots in short time. Any one is acceptable, as the halftone dot image display unit of the present invention, which has a function that a desired position on a multi-tone level image displayed on the display screen are designated, the partial halftone dot image data representative of the partial halftone dot image is generated from the partial multi-tone level image data representative of the partial multi-tone level image within the peripheral area of the designated position, and the partial halftone dot image represented by the partial halftone dot image data is displayed on the display screen. Having this function makes it possible to implement that the partial halftone dot image of the periphery of the portion of the interest is displayed in short time.

As mentioned above, according to the present invention, there are provided a halftone dot image display capable of displaying halftone dots in short time, and a halftone dot image display program storage medium storing a halftone dot image display program which causes a computer to operate as such a halftone dot image display unit.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A halftone dot image display unit comprising:
    a multi-tone level image display section for displaying a multi-tone level image represented by multi-tone level image data consisting of an assembly of pixels each having a pixel value according to a gradation;
    a position designation section for designating a desired position on the multi-tone level image displayed by said multi-tone level image display section;
    a data deriving section for deriving partial multi-tone level image data representative of the partial multi-tone level image within a peripheral area of the position designated by said position designation section, of the multi-tone level image, from the multi-tone level image data representative of the multi-tone level image displayed by said multi-tone level image display section;
    a partial halftone dot image data generation section causing the partial multi-tone level image data derived by said data deriving section to be affected by a predetermined threshold matrix so as to generate partial halftone dot image data representative of the partial halftone dot image associated with the partial multi-tone level image; and
    a partial halftone dot image display section for displaying a partial halftone dot image represented by the partial halftone dot image data generated by said partial halftone dot image data generation section.

2. A halftone dot image display unit according to claim 1 further comprising an area size designation section for designating a size of a peripheral area of the position designated by said position designation section, on the multi-tone level image displayed by said multi-tone level image display section, in accordance with an operation, wherein said data deriving section derives the partial multi-tone level image data representative of the partial multi-tone level image within the peripheral area of the position designated by said area size designation section, from the multi-tone level image data representative of the multi-tone level image.

3. A halftone dot image display unit according to claim 1, wherein said halftone dot image display unit further comprises:
    a resolution designation section for designating a resolution of the partial halftone dot image displayed by said partial halftone dot image display section in accordance with an operation; and
    a resolution conversion section for applying a resolution conversion processing according to the resolution designated by said resolution designation section to the partial multi-tone level image data derived by said data deriving section, and
    wherein said partial halftone dot image data generation section causes partial multi-tone level image data subjected to the resolution conversion processing by said resolution conversion section to be affected by a predetermined threshold matrix so as to generate partial halftone dot image data representative of the partial halftone dot image associated with the partial multi-tone level image represented by the partial multi-tone level image data.

4. A halftone dot image display unit according to claim 3, wherein said halftone dot image display unit further comprises:
    a color conversion section for applying a color conversion processing to the partial multi-tone level image data derived by said data deriving section, and
    wherein said partial halftone dot image data generation section causes partial multi-tone level image data subjected to both the color conversion processing by said color conversion section and the resolution conversion processing by said resolution conversion section to be affected by a predetermined threshold matrix so as to generate partial halftone dot image data representative of the partial halftone dot image associated with the partial multi-tone level image represented by the partial multi-tone level image data.

5. A halftone dot image display unit according to claim 1, wherein said halftone dot image display unit further comprises an information display section for displaying a pixel value of the position designated by said position designation section, of the multi-tone level image displayed by said multi-tone level image display section, and a dot % value of a position corresponding to a position on the multi-tone level image designated by said position designation section, of the partial halftone dot image represented by the partial halftone dot image data generated by said partial halftone dot image data generation section.

6. A halftone dot image display unit according to claim 5, wherein said halftone dot image display unit further comprises:
    a color conversion section for applying a color conversion processing to the partial multi-tone level image data derived by said data deriving section, and
    wherein said information display section displays, in addition to said pixel value and said dot % value, a pixel value of a position corresponding to a position on the multi-tone level image designated by said position designation section, of the partial multi-tone level image represented by the partial multi-tone level image data subjected to the color conversion processing.

7. A halftone dot image display program storage medium storing a halftone dot image display program which causes a computer to operate as a halftone dot image display unit, said halftone dot image display unit comprising:

- a multi-tone level image display section for displaying a multi-tone level image represented by multi-tone level image data consisting of an assembly of pixels each having a pixel value according to a gradation;
- a position designation section for designating a desired position on the multi-tone level image displayed by said multi-tone level image display section;
- a data deriving section for deriving partial multi-tone level image data representative of the partial multi-tone level image within a peripheral area of the position designated by said position designation section, of the multi-tone level image, from the multi-tone level image data representative of the multi-tone level image displayed by said multi-tone level image display section;
- a partial halftone dot image data generation section causing the partial multi-tone level image data derived by said data deriving section to be affected by a predetermined threshold matrix so as to generate partial halftone dot image data representative of the partial halftone dot image associated with the partial multi-tone level image; and
- a partial halftone dot image display section for displaying a partial halftone dot image represented by the partial halftone dot image data generated by said partial halftone dot image data generation section.

* * * * *